(12) United States Patent
Cornell

(10) Patent No.: US 10,535,177 B2
(45) Date of Patent: Jan. 14, 2020

(54) SYSTEMS AND METHODS FOR INTERACTIVE BROADCASTING

(71) Applicant: Facebook, Inc., Menlo Park, CA (US)

(72) Inventor: Alex Douglas Cornell, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 143 days.

(21) Appl. No.: 15/225,761

(22) Filed: Aug. 1, 2016

(65) Prior Publication Data
US 2018/0034874 A1   Feb. 1, 2018

(51) Int. Cl.
*G06T 13/80*   (2011.01)
*H04L 29/06*   (2006.01)

(52) U.S. Cl.
CPC ............ *G06T 13/80* (2013.01); *H04L 65/403* (2013.01); *H04L 65/4076* (2013.01); *G06T 2200/24* (2013.01)

(58) Field of Classification Search
CPC ....... H04L 65/60; H04L 51/32; H04L 65/403; H04L 65/4076; H04L 12/18; G06T 13/80; G06T 2200/24; G06Q 10/10; G06Q 50/01; H04N 21/475; H04N 21/4756; H04N 21/4788
See application file for complete search history.

(56) References Cited

U.S. PATENT DOCUMENTS

| | | | | |
|---|---|---|---|---|
| 8,095,400 B2* | 1/2012 | Herde | ................. | G06Q 10/02 705/5 |
| 2013/0013778 A1* | 1/2013 | Herde | ................. | G06Q 10/02 709/225 |
| 2014/0164382 A1* | 6/2014 | Keebler | ........... | G06F 17/30893 707/737 |
| 2015/0050998 A1* | 2/2015 | Stelovsky | ............. | A63F 13/60 463/31 |
| 2016/0105505 A1* | 4/2016 | Gilson | ............... | H04L 67/1095 709/219 |
| 2017/0185254 A1* | 6/2017 | Zeng | ..................... | G06F 3/0481 |
| 2017/0185268 A1* | 6/2017 | Zeng | ................... | G06F 3/04845 |

* cited by examiner

*Primary Examiner* — Kristie D Shingles
(74) *Attorney, Agent, or Firm* — Sheppard Mullin Richter & Hampton LLP

(57) ABSTRACT

Systems, methods, and non-transitory computer-readable media can provide an interface that includes a first region and a second region, wherein a live content stream being accessed is presented in the first region, and wherein one or more feedback options for interacting with the live content stream are presented in the second region. A determination is made that at least one user accessing the live content stream has selected a feedback option in response to the live content stream. At least one visual feature corresponding to the selected feedback option is displayed in the first region in which the live content stream is being presented.

16 Claims, 17 Drawing Sheets

SYSTEMS AND METHODS FOR INTERACTIVE BROADCASTING

FIELD OF THE INVENTION

The present technology relates to the field of content broadcasting. More particularly, the present technology relates to techniques for interacting with live content broadcasts.

BACKGROUND

Today, people often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

SUMMARY

Various embodiments of the present disclosure can include systems, methods, and non-transitory computer readable media configured to provide an interface that includes a first region and a second region, wherein a live content stream being accessed is presented in the first region, and wherein one or more feedback options for interacting with the live content stream are presented in the second region. A determination is made that at least one user accessing the live content stream has selected a feedback option in response to the live content stream. At least one visual feature corresponding to the selected feedback option is displayed in the first region in which the live content stream is being presented.

In an embodiment, the systems, methods, and non-transitory computer readable media are configured to determine that the user is a social connection of a user operating the computing device in a social networking system and cause the visual feature to be presented in the first region based at least in part on a first type of animation.

In an embodiment, the first type of animation is a firework animation in which the visual feature is animated to resemble an exploding firework while being navigated across the first region of the interface along a first motion trajectory.

In an embodiment, the visual feature initially corresponds to an avatar of the user that selected the feedback option.

In an embodiment, while being navigated along the first motion trajectory, the visual feature is transitioned from the avatar to an icon corresponding to the selected feedback option.

In an embodiment, the systems, methods, and non-transitory computer readable media are configured to determine that the user is not a social connection of a user operating the computing device in a social networking system and cause the visual feature to be presented in the first region based at least in part on a second type of animation.

In an embodiment, the second type of animation is a wind animation in which the visual feature is navigated across the first region of the interface along a second motion trajectory.

In an embodiment, the systems, methods, and non-transitory computer readable media are configured to determine that a user broadcasting the live content stream has interacted with the visual feature through a computing device being operated by the broadcasting user and cause a visual acknowledgement for the visual feature to be displayed in the first region in which the live content stream is being presented.

In an embodiment, the systems, methods, and non-transitory computer readable media are configured to determine that at least one second user accessing the live content stream has selected a second feedback option in response to the live content stream and cause at least one visual feature corresponding to the second feedback option to also be displayed in the first region in which the live content stream is being presented.

In an embodiment, the feedback option is one of a like option or a reaction from a set of reaction options.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
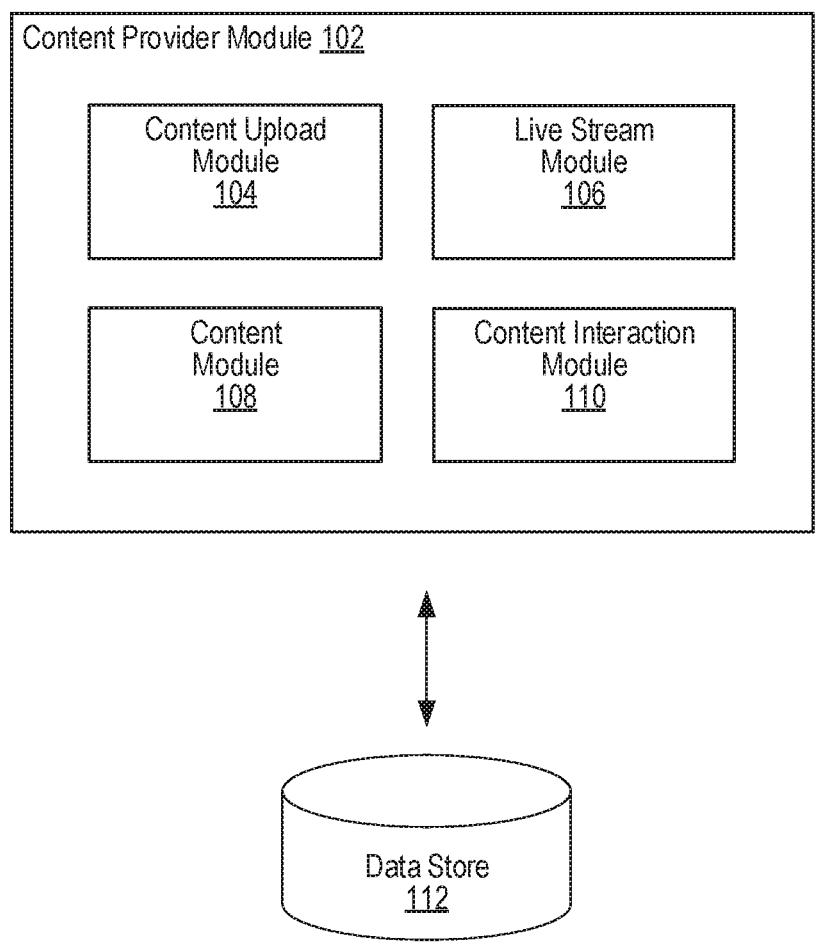
FIG. 1 illustrates an example system including an example content provider module configured to provide access to various content items, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Shared Broadcasting

Today, people often utilize computing devices (or systems) for a wide variety of purposes. Users can use their computing devices to, for example, interact with one another, access content, share content, and create content. In some cases, content items can include postings from members of a social network. The postings may include text and media content items, such as images, videos, and audio. The postings may be published to the social network for consumption by others.

Under conventional approaches, content may be broadcast through a content provider (e.g., a social networking system) using various broadcast mediums (e.g., Internet broadcasting, etc.). In one example, a live content stream can include content that is being captured and streamed live by a user (e.g., a broadcaster). For example, the broadcaster can capture and stream an event (e.g., a live video of the broadcaster, concert, speech, etc.) as part of a live content stream. Such events can be captured using computing devices (e.g., mobile devices with audio and video capture capabilities) and/or standalone devices (e.g., video cameras and microphones). A user (e.g., a viewer) operating a computing device can access the live content stream through the social networking system. In response, the social networking system encodes and provides data corresponding to the live content stream to the user's computing device over a network (e.g., the Internet) in real-time. The computing device can decode and present the live content stream, for example, through a display screen of the computing device. In general, the live content stream continues to be provided to the user's computing device until the broadcaster discontinues broadcasting the live content stream or the user instructs the computing device to stop accessing the live content stream. In some instances, users viewing the live content stream may want to provide feedback to the broadcaster to support or encourage the broadcaster to continue broadcasting, for example. In another example, the users may want to encourage the broadcaster to continue a particular segment of the broadcast (e.g., a segment discussing a certain topic, presenting certain subject matter, etc.). Under conventional approaches, user feedback can typically be limited to posting comments in response to the live content stream or selecting an option to like the live content stream, for example. Such feedback can be ineffective for live content streams since it requires the broadcaster to monitor the feedback (e.g., likes, comments, etc.) while broadcasting. For example, the broadcaster may be accessing an interface that includes a first region in which the live content stream is presented and a second region in which the user feedback is shown (e.g., likes, comments, etc.). In this example, while monitoring the broadcast through the first region, the broadcaster would need to divert their attention to the second region to review the user feedback. This may affect the quality of the broadcast and is, therefore, undesirable. Presenting such user feedback can also be ineffective since it fails to convey temporality. That is, it is generally difficult for the broadcaster to keep track of what portion of the broadcast (e.g., a certain topic being discussed, a certain act or performance, etc.) prompted users to submit likes, reactions, and/or comments. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. In various embodiments, users viewing the live content stream can provide feedback using a set of options including a like option and one or more reaction options (e.g., funny, happy, sad, angry, etc.). In such embodiments, visual features corresponding to such user feedback can be presented as overlays in the same region of the interface in which the live content stream is being presented. Thus, the broadcaster is able to monitor the visual features and the live content stream in the same region of the interface.

FIG. 1 illustrates an example system 100 including an example content provider module 102 configured to provide access to various content items, according to an embodiment of the present disclosure. As shown in the example of FIG. 1, the content provider module 102 can include a content upload module 104, a live stream module 106, a content module 108, and a content interaction module 110. In some instances, the example system 100 can include at least one data store 112. The components (e.g., modules, elements, etc.) shown in this figure and all figures herein are examples only, and other implementations may include additional, fewer, integrated, or different components. Some components may not be shown so as not to obscure relevant details.

In some embodiments, the content provider module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content provider module 102 can be implemented, in part or in whole, as software running on one or more computing devices or systems, such as on a user or client computing device. In one example, the content provider module 102 or at least a portion thereof can be implemented as or within an application (e.g., app), a program, or an applet, etc., running on a user computing device or a client computing system, such as the user device 610 of FIG. 6. In another example, the content provider module 102 or at least a portion thereof can be implemented using one or more computing devices or systems that include one or more servers, such as network servers or cloud servers. In some instances, the content provider module 102 can, in part or in whole, be implemented within or configured to operate in conjunction with a social networking system (or service), such as the social networking system 630 of FIG. 6.

The content provider module 102 can be configured to communicate and/or operate with the at least one data store 112, as shown in the example system 100. The at least one data store 112 can be configured to store and maintain various types of data. For example, the data store 112 can store information describing various content that is being streamed live through the social networking system and/or content items that have been posted by users of the social networking system. In some implementations, the at least one data store 112 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 112 can store information associated with users, such as user identifiers, user information, profile information, user specified settings, content produced or posted by users, and various other types of user data.

The content provider module 102 can be configured to provide users with access to content items that are posted through a social networking system. For example, a user can interact with an interface that is provided by a software application (e.g., a social networking application) running on a computing device of the user. This interface can include an option for posting, or uploading, content items to the social networking system. When posting a content item, the content upload module 104 can be utilized to communicate data describing the content item from the computing device to the social networking system. Such content items may include text, images, audio, and videos, for example. The social networking system can then provide the content item through the social networking system including, for example, in one or more news feeds. In some embodiments, the interface can also include an option for live streaming content through the social networking system. When initiating a live content stream, the live stream module 106 can be utilized to communicate data (e.g., audio data, video data, etc.) corresponding to the content to be streamed live from the computing device and through the social networking system. The live stream module 106 can utilize any generally known techniques that allow for live streaming of content including, for example, the Real Time Messaging Protocol (RTMP). In various embodiments, the computing device from which the live content stream is being provided can be equipped to capture data (e.g., video data, audio data, etc.) corresponding to the live content stream.

The interface provided by the software application can also be used to access posted content items, for example, using the content module 108. For example, the content module 108 can include content items in a user's news feed. Such content items may include on-demand content items (e.g., video on-demand or "VOD") as well as content that is being streamed live. In this example, the user can access content items while browsing the news feed. In another example, the user can access content items by performing searches through the interface. For example, the user can search for a given content item or live content stream, for a user that posted a content item or live content stream, and/or for search terms that correspond to a content item or live content stream. In one example, the user may select an option to view a live content stream and, in response, the social networking system can send data corresponding to the live content stream to a computing device of the user. In this example, the social networking system can continue sending data corresponding to the live content stream until, for example, the broadcaster of the live content stream discontinues streaming or if the user selects an option to discontinue playback of the live content stream. The content interaction module 110 can be configured to provide users with options for interacting with broadcasters of live content streams. Although the examples herein refer to live content streams, the approaches described herein may also be applied to on-demand content items. More details regarding the content interaction module 110 will be provided below with reference to FIG. 2.

Figure 2:
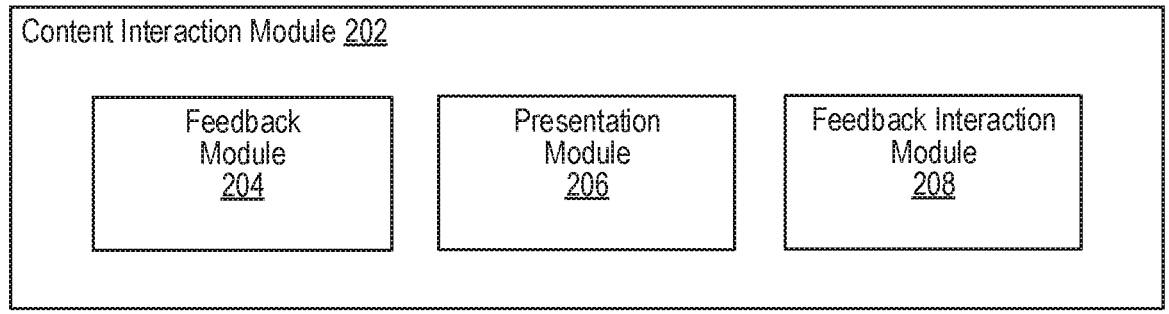
FIG. 2 illustrates an example of a content interaction module, according to an embodiment of the present disclosure.

FIG. 2 illustrates an example of a content interaction module 202, according to an embodiment of the present disclosure. In some embodiments, the content interaction module 110 of FIG. 1 can be implemented as the content interaction module 202. As shown in FIG. 2, the content interaction module 202 can include a feedback module 204, a presentation module 206, and a feedback interaction module 208.

Figure 3A:
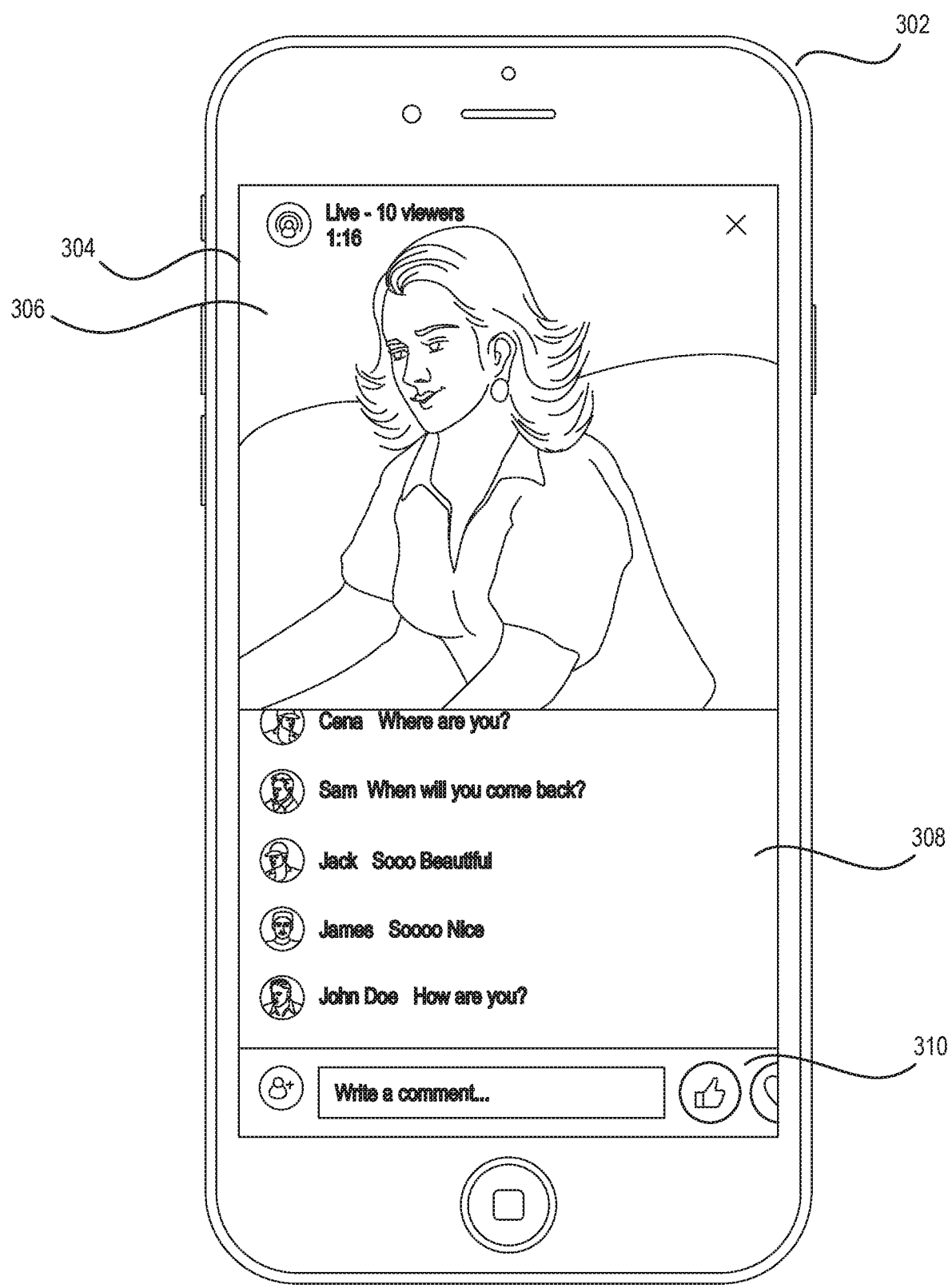
FIGS. 3A-K illustrate example interfaces for interacting with content items, according to an embodiment of the present disclosure.

In various embodiments, the feedback module 204 can provide users with one or more feedback options for interacting with broadcasters of live content streams. For example, as illustrated in FIG. 3A, a user operating a computing device 302 can access, or view, a live content stream through a viewer interface 304 that includes a first region 306 in which the live content stream is presented and a second region 308 in which various information relating to the live content stream is presented (e.g., user comments, a number of likes and/or reactions received for the live content stream, etc.). In this example, the second region 308 of the viewer interface can also include various feedback options 310 for interacting with the broadcaster of the live content stream including, for example, a like option and one or more reaction options (e.g., funny, happy, sad, angry, etc.). Similarly, the broadcaster of the live content stream can also operate a computing device to access a broadcaster interface through which content being captured using the computing device is streamed. The broadcaster interface can include a first region in which the live content stream being captured is shown and a second region in which various information relating to the live content stream is presented (e.g., user comments, a number of likes and/or reactions received for the live content stream, etc.). In this example, the second region of the broadcaster interface can also include one or more broadcaster-specific options including, for example, an option for ending the live broadcast and options for applying filters to modify the presentation of the live broadcast, to name some examples. As used herein, the term "interface" can refer to the broadcaster interface, the viewer interface, or both.

In various embodiments, when a user that is viewing the live content stream selects one or more feedback options, the presentation module 206 displays corresponding visual features (e.g., icons, bubbles, avatars, etc.) in the interfaces of all users that are associated with the live content stream (e.g., the broadcaster and the users viewing the live content stream). In various embodiments, the visual features are displayed in the first region of the interface, i.e., the region in which the live content stream is being presented. Thus, in some embodiments, such visual features are displayed as overlays. That is, the visual features are displayed over the live content stream being displayed. The presentation module 206 can display the visual features corresponding to selected feedback options in real-time. In other words, the presentation module 206 can present a visual feature corresponding to a feedback option as soon as selection of the feedback option is detected. In some instances, there may be multiple users that select feedback options in response to the live content stream. Thus, at any given time, there may be many visual features that are presented in the user interfaces in response to the multiple feedback options being selected. In some embodiments, each visual feature is displayed for a finite period of time. In general, the presentation module 206 continues to display visual features in response to feedback options being selected until the live content stream broadcast ends or until the user instructs their computing device to stop accessing the live content stream.

Figure 3B:
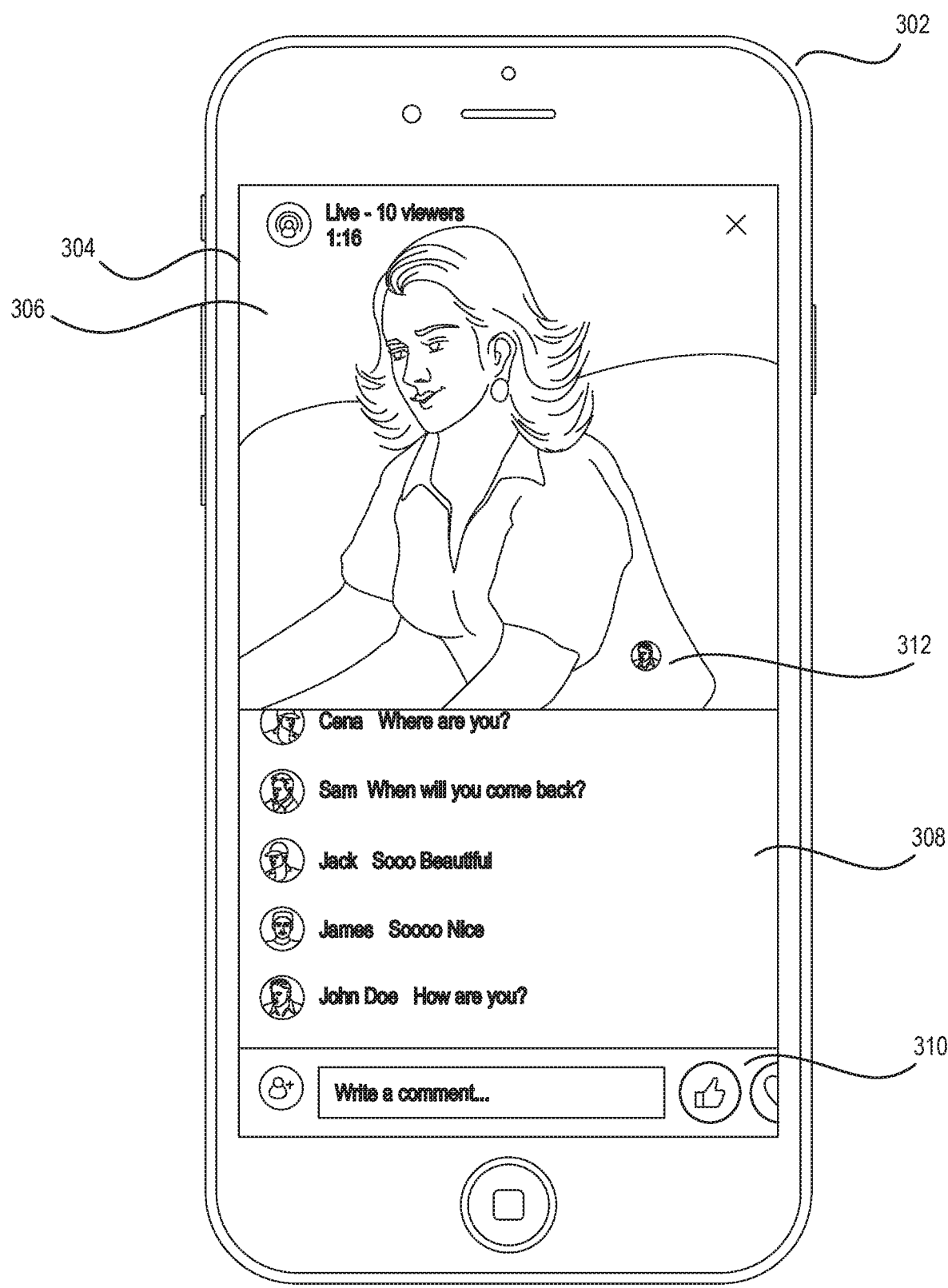
Figure 3C:
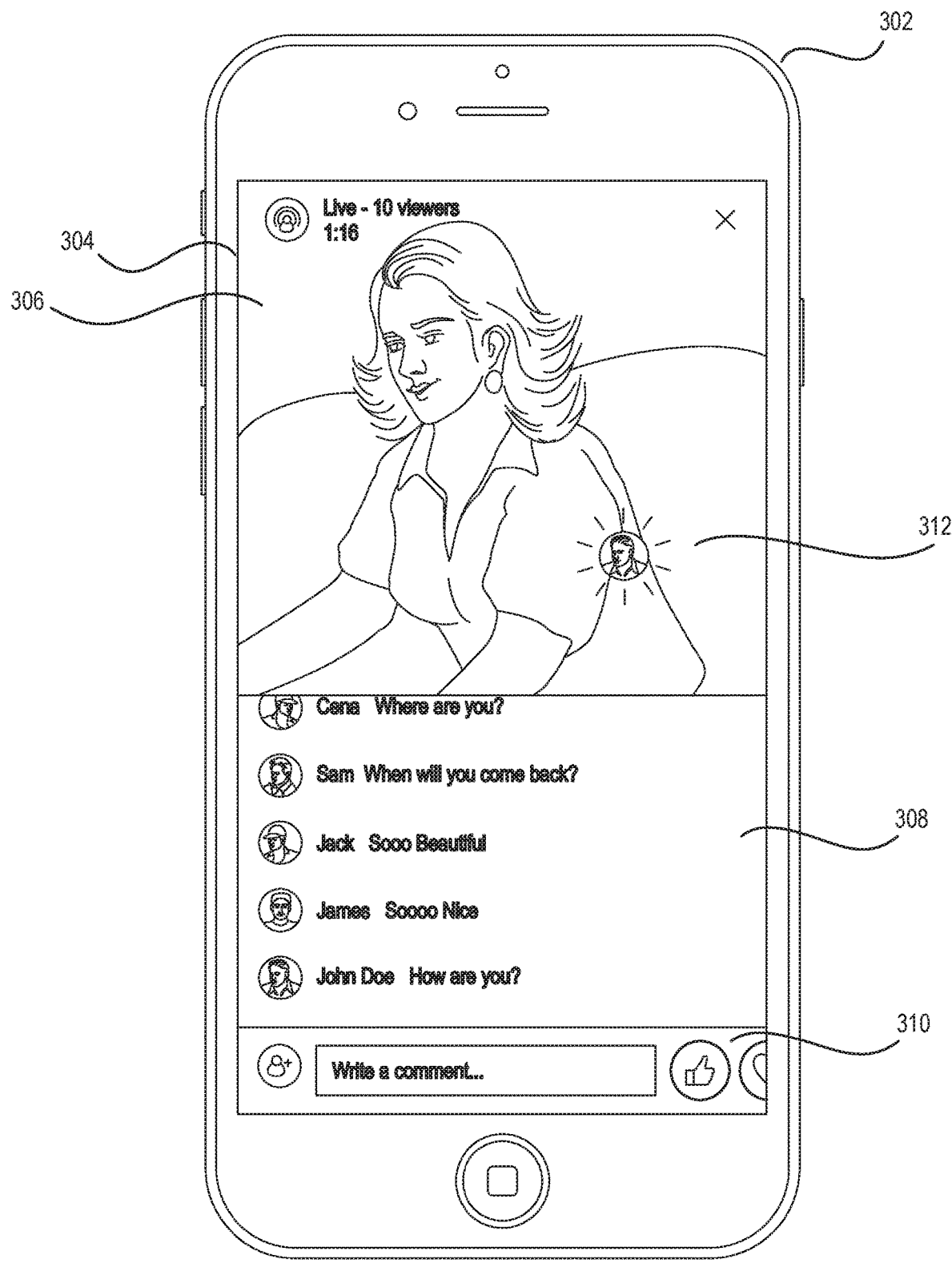
Figure 3D:
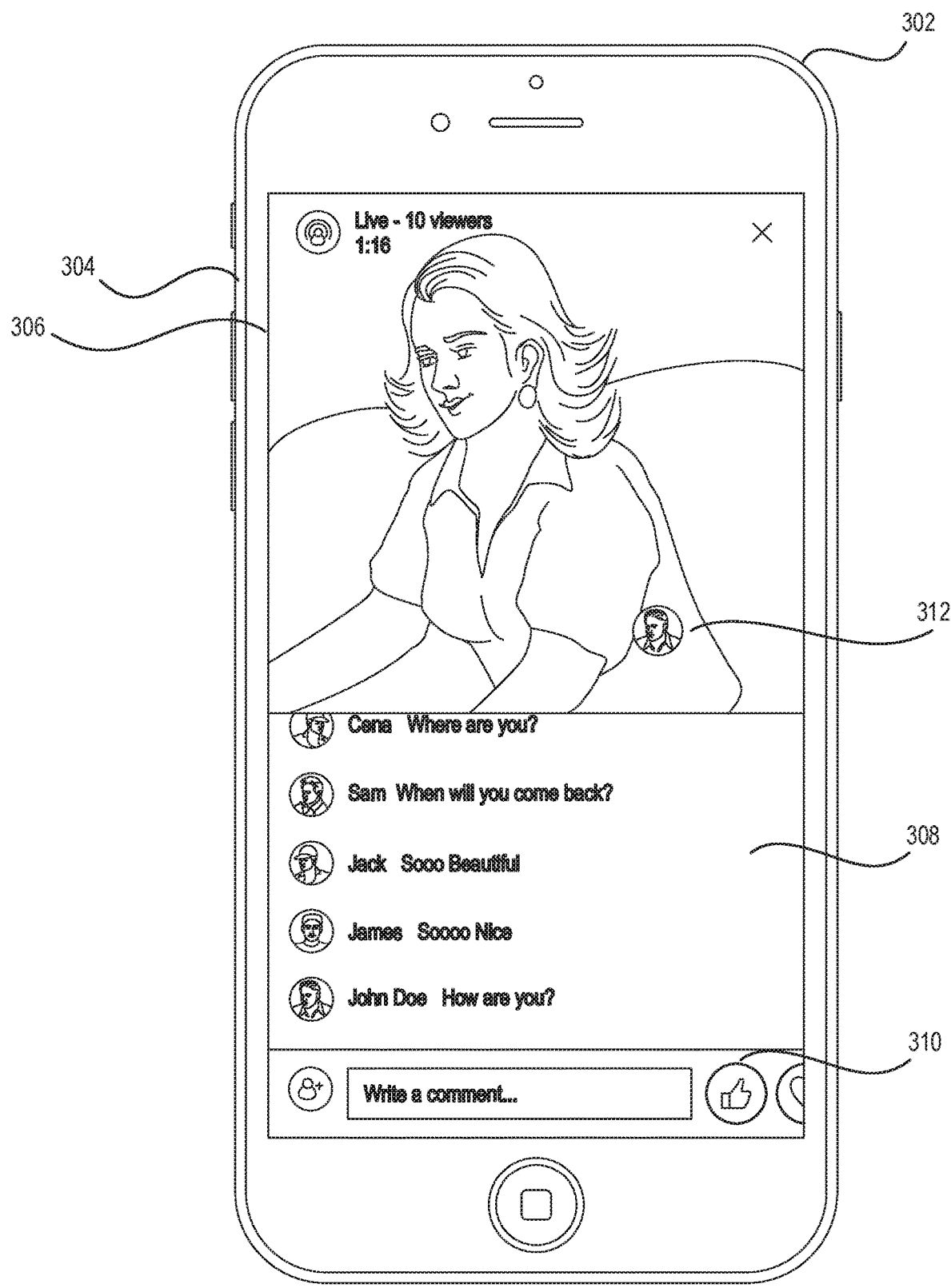

The visual feature that is shown in response to a feedback option being selected can vary depending on the feedback option that was selected, the user that selected the feedback option, or both. For example, FIG. 3B illustrates an example of a visual feature 312 being displayed in the first region 306 of the computing device 302. In this example, the visual feature 312 corresponds to an avatar (e.g., profile image) of a user that selected a feedback option 310. In some embodiments, the visual feature 312 can be animated using various visual effects. For example, in some embodiments, the visual feature 312 is animated to simulate a firework explosion. For example, FIG. 3C illustrates an example firework animation of the visual feature 312 during which the visual feature 312 is simulated as visually exploding like a firework. The visual features can also be animated, or navigated, across the interface 304. In some embodiments, the presentation module 206 navigates the visual features along one or more motion trajectories or paths. For example, as illustrated in the example of FIG. 3D, once the firework animation is complete, the visual feature 312 can be navigated along a motion trajectory, or path, that begins from a first edge of the interface 304 (e.g., the right edge of the interface 304) and ends at a second edge of the interface 304 (e.g., the left edge of the interface 304). In such embodiments, the presentation of the visual feature 312 in the interface 304 can cease once the visual feature 312 reaches the second edge of the interface 304. In some embodiments, each visual feature follows a pre-defined motion trajectory. In some embodiments, the visual features are navigated across the interface 304 along the same motion trajectory. In other words, all visual features displayed in the interface 304 will navigate the same path beginning from the first edge and ending at the second edge. In some embodiments, each visual feature is assigned a separate motion trajectory. That is, in such embodiments, the respective position of a visual feature can vary as the visual feature navigates from the first edge to the second edge. In one example, the respective position of the visual feature can randomly vary along the y-axis so that different visual features follow different motion trajectories when presented in the interface 304. In some embodiments, the variance of such visual feature positions can be bounded so that the visual features are navigated within a designated area of the interface.

Figure 3E:
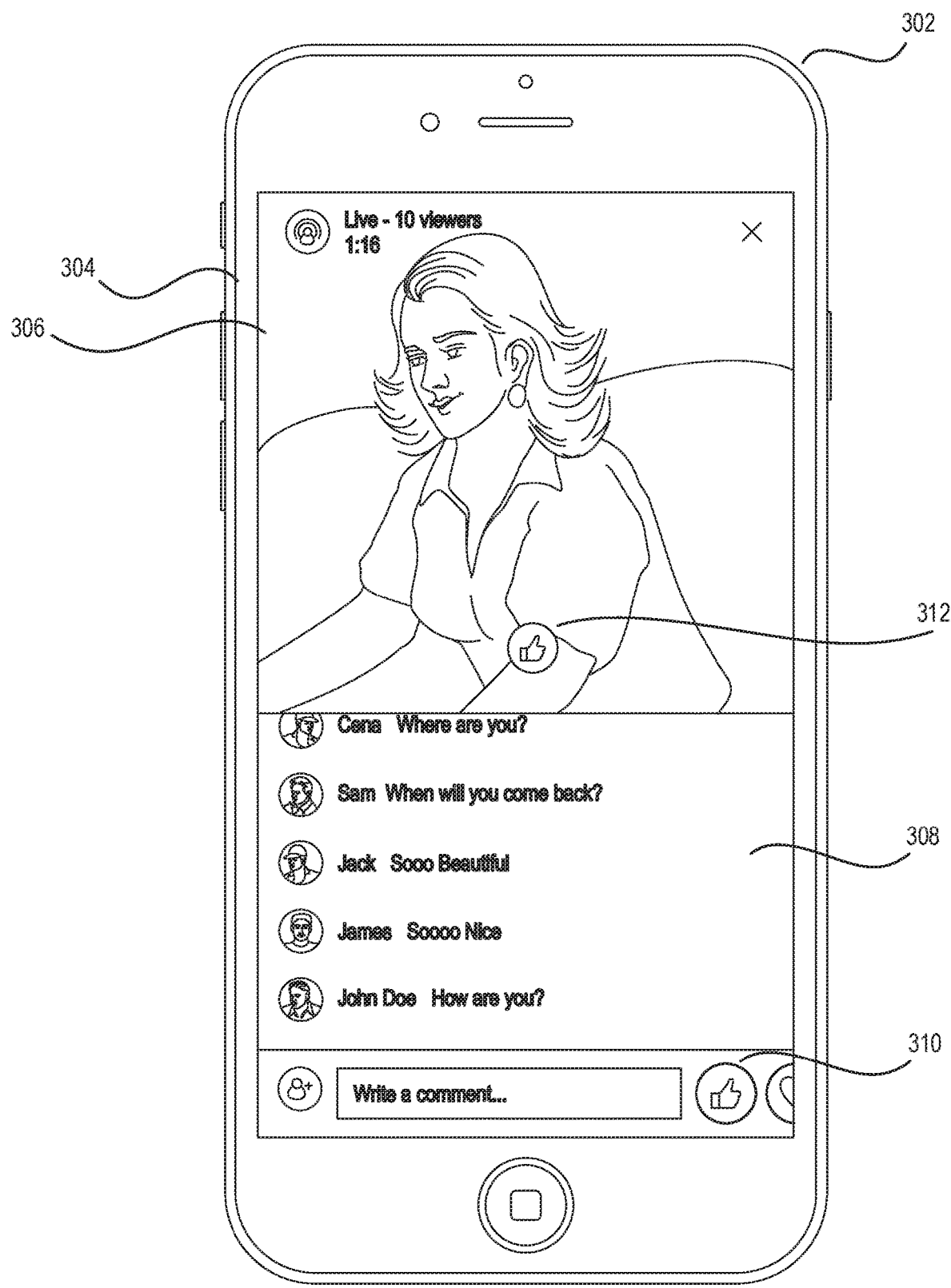
Figure 3F:
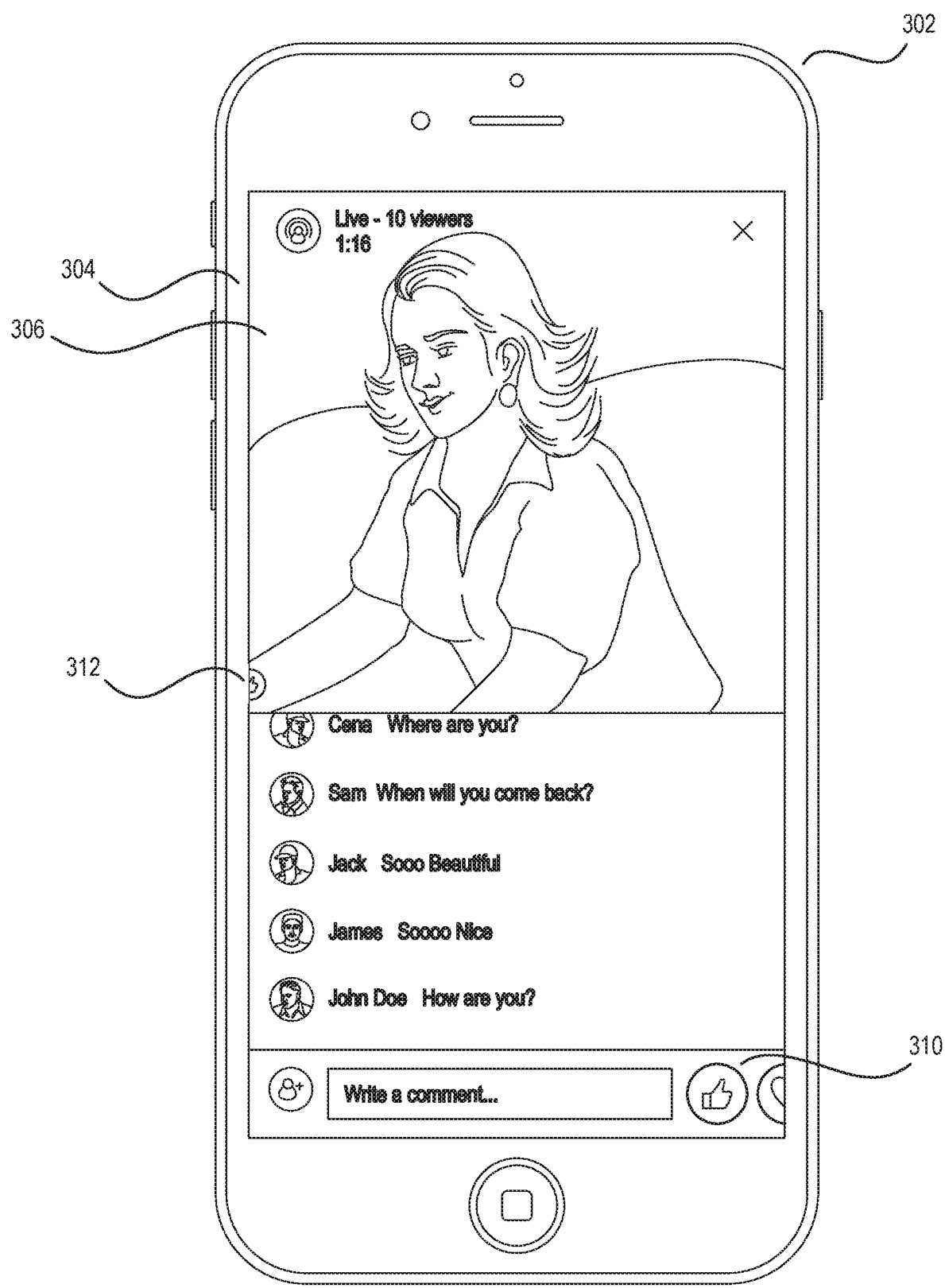

While navigating the visual feature 312 along the motion trajectory, the presentation module 206 can also morph, or transition, the visual feature 312 into different visual representations. For example, a visual feature that originally corresponded to an avatar of a user can be morphed to correspond to the feedback option that was selected by the user (e.g., an icon representing the selected feedback option). For example, in FIG. 3D, the visual feature 312 was displayed in response to the user operating the computing device 302 having selected the like option 310. As a result, the visual feature 312, as shown in FIG. 3E, is morphed from an avatar of the user to a visual representation that corresponds to an icon representing the selected like option 310. In some embodiments, the presentation module 206 continues to navigate the visual feature 312 along the motion trajectory up to a pre-defined region of the interface 304. Once the pre-defined region of the interface 304 is reached, the visual feature 312 can be removed from the interface 304 (e.g., gradually faded out, dissipated, etc.). In some embodiments, the presentation module 206 continues to navigate the visual feature 312 along the motion trajectory until the visual feature 312 exits the interface 304, as illustrated in the example of FIG. 3F.

Figure 3G:
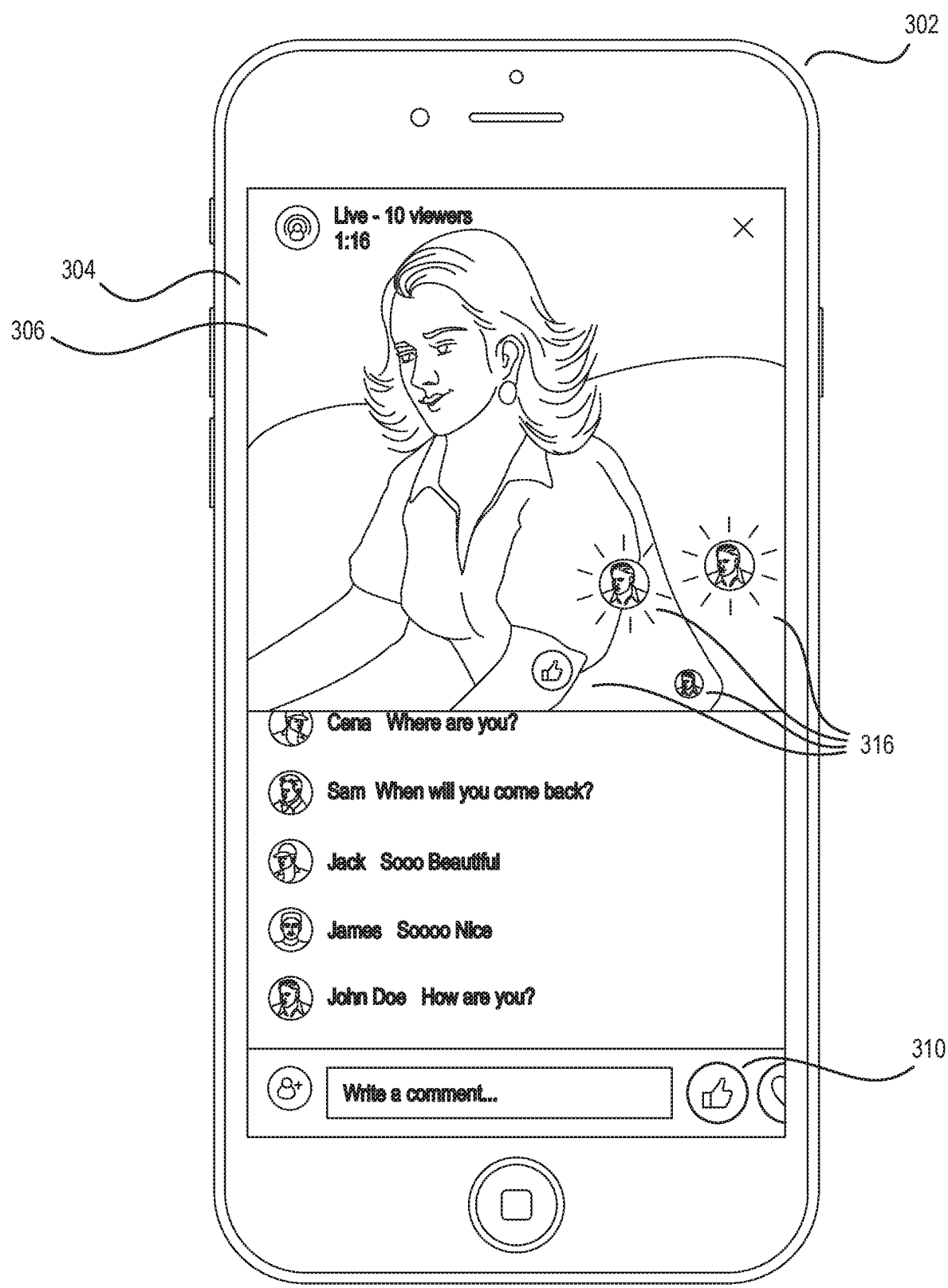
Figure 3H:
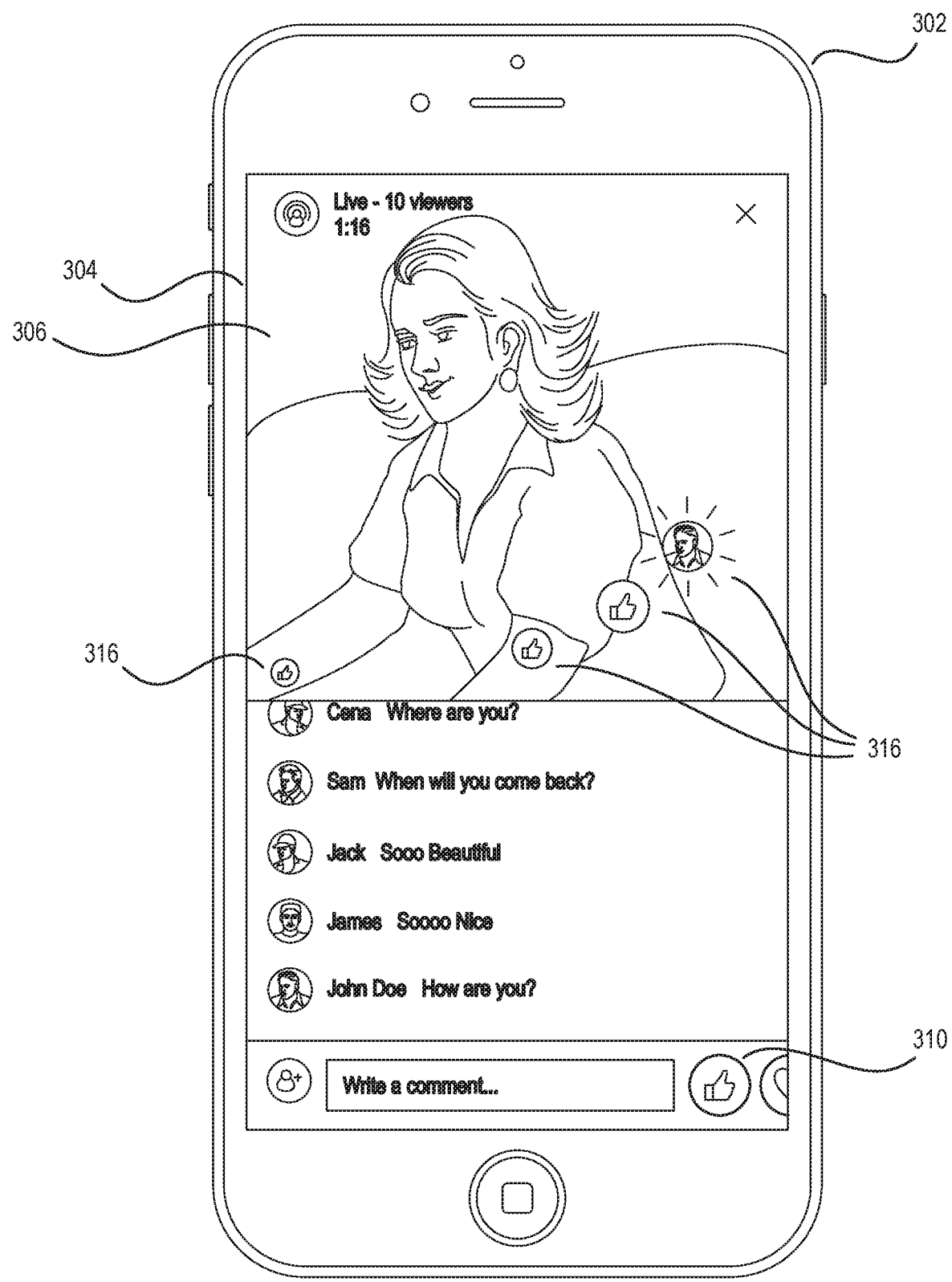

In various embodiments, a corresponding visual feature is displayed in the interface each time a feedback option is selected by a user accessing the live content stream. For example, in FIG. 3G, the user operating the computing device 302 has selected the like option 310 multiple times. As a result, multiple corresponding visual features 316 are shown in the interface 304. Each visual feature can be animated as firework animations, for example. Further, each visual feature can be morphed and/or navigated across the interface 304 along a motion trajectory, as described above. For example, in FIG. 3H, each of the visual features 316 are being navigated across the interface 304 along their respective motion trajectories. The visual features 316 are also being morphed to visually represent the selected like option 310. In some embodiments, the number of visual features displayed in response to feedback option selections are rate-limited to prevent overcrowding of visual features in the interface 304.

Figure 3I:
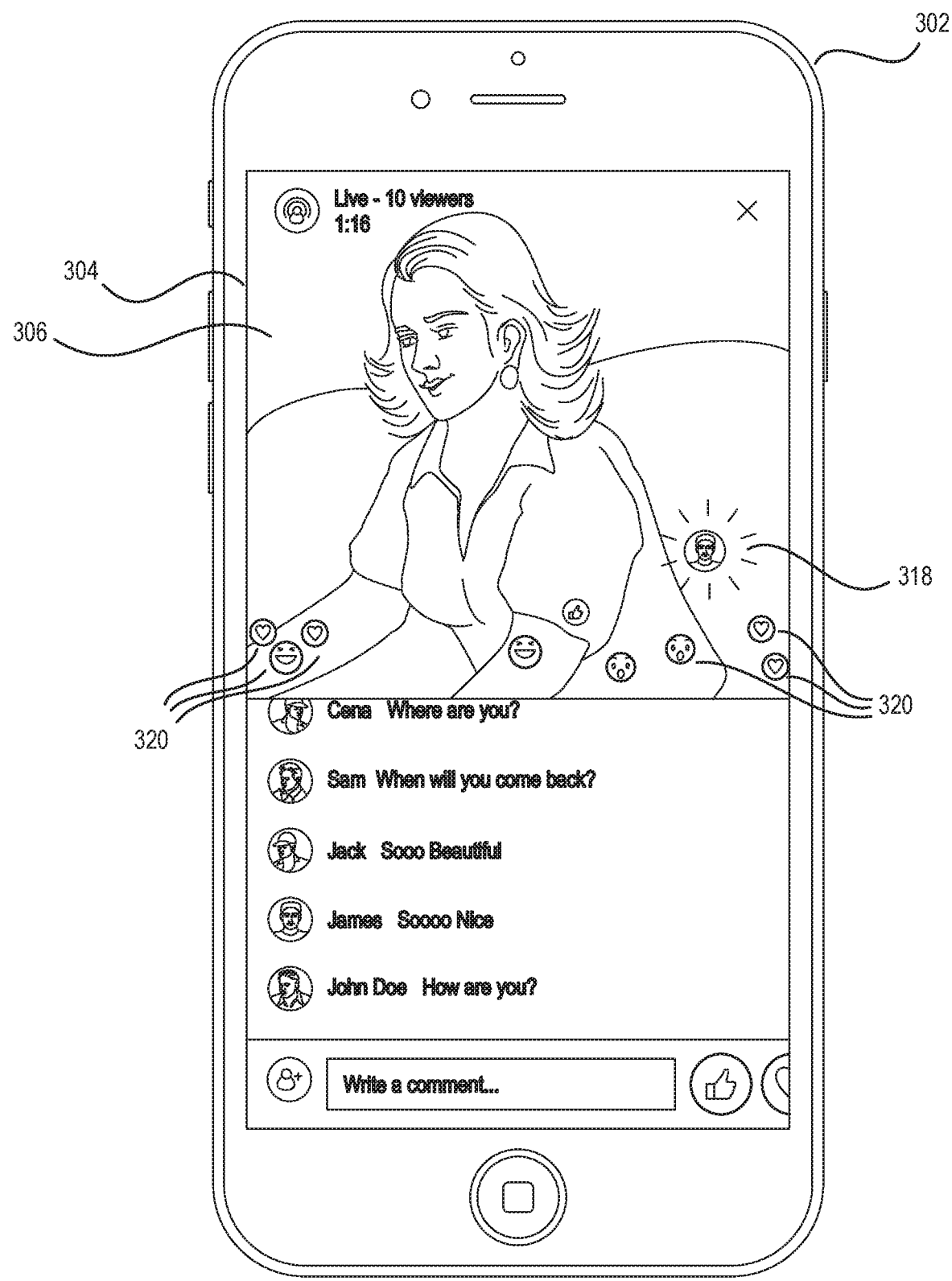

The visual features displayed in the examples of FIGS. 3A-H were displayed in response to a user operating the computing device 302 selecting feedback options. Such visual features were presented in the interface using a "firework" animation. In some embodiments, the presentation module 206 applies the firework animation to a visual feature by initially displaying an avatar of a user in the visual feature. In some embodiments, the avatar shoots up from a bottom edge of the interface to simulate a firework launch. In some embodiments, the size of the avatar is gradually increased during the simulated firework launch (e.g., by some percentage). As mentioned, the visual feature may be displayed in response to the user selecting a feedback option. While the visual feature is being navigated along a motion trajectory, the presentation module 206 visually simulates a firework explosion using the visual feature. As the visual feature continues to navigate to the edge of the interface, the presentation module 206 causes the avatar displayed in the visual feature to visually transition to an icon that corresponds to the user's selected feedback option. In some embodiments, the size of the visual feature as the avatar transitions to the icon is gradually reduced. In some embodiments, the firework animation is also applied to visual features that were triggered by social connections (e.g., friends) of the broadcaster, the user accessing the live content stream, or both. A social connection between two users can be determined by the presentation module 206 based on a social graph that is managed by the social networking system. In some embodiments, the firework animation is only used to animate visual features that were produced by social connections of the user accessing the live content stream. In such embodiments, each user accessing the live content stream can be have a different visual experience since only the visual features that are produced by their social connections will be animated using the firework animation. For example, as illustrated in FIG. 3I, when a viewer that is a social connection of the user operating the computing device 302 selects a like option, the interface 304 can present a corresponding visual feature 318 by first displaying an avatar of the user's social connection, then simulating a firework explosion using the visual feature 318, and finally transitioning the avatar to an icon corresponding to selected like option, all while navigating the visual feature 318 along a motion trajectory.

In some embodiments, different animations and/or motion trajectories may be applied to visual features that were displayed in response to feedback options selected by users that are not social connections. For example, in some embodiments, the presentation module 206 applies a "wind" animation to visual features that were produced by users that are not social connections. In such embodiments, when the wind animation is applied to a visual feature, an icon corresponding to the selected feedback option is shown in the visual feature without simulating a firework explosion. For example, as illustrated in FIG. 3I, when viewers that are not social connections of the user operating the computing device 302 select feedback options (e.g., likes, reactions, etc.), the interface 304 can present visual features 320 corresponding to the selected feedback options. These visual features 320 can also be navigated across the interface 304 along one or more motion trajectories. In some embodiments, visual features that were produced by users that are not social connections of the user operating the computing device 302 are navigated along a different motion trajectory than visual features that were produced by social connections of the user.

Figure 3J:
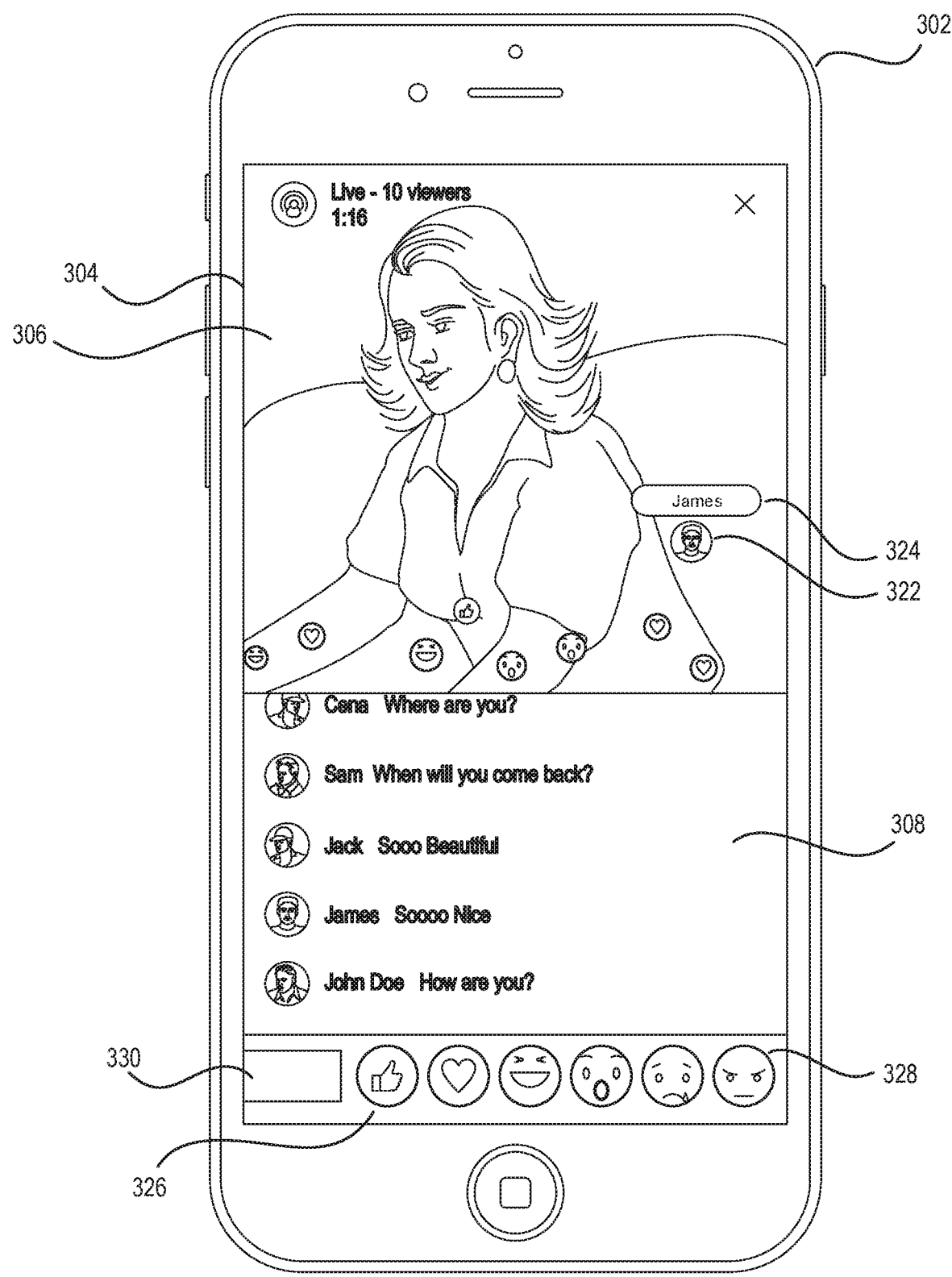

In some embodiments, the broadcaster and users viewing the live content stream can interact with visual features being displayed in their respective interfaces to reveal information about the users that produced the visual features. For example, as illustrated in FIG. 3J, the user operating the computing device 302 can select a visual feature 322 to reveal information describing the user whose feedback option selection caused the visual feature 322 to be displayed. In this example, a name 324 of the user is displayed in the interface 302 in response to the visual feature 322 being selected. In some embodiments, visual features can be selected using one or more gestures (e.g., tap gesture, double-tap gesture, touch-and-hold gesture, etc.). In some embodiments, additional feedback options 328 can be accessed in the second region 308 of the interface 304, for example, by swiping the feedback option tray 326. For example, the user operating the computing device 302 can swipe the feedback option tray 326 to the left to reveal more feedback options 328 (e.g., the like option and additional reaction options). In this example, the user can also swipe the feedback option tray 326 to the right to hide the additional feedback options 328 so that the text field 330 for entering comments is again fully visible.

Figure 3K:
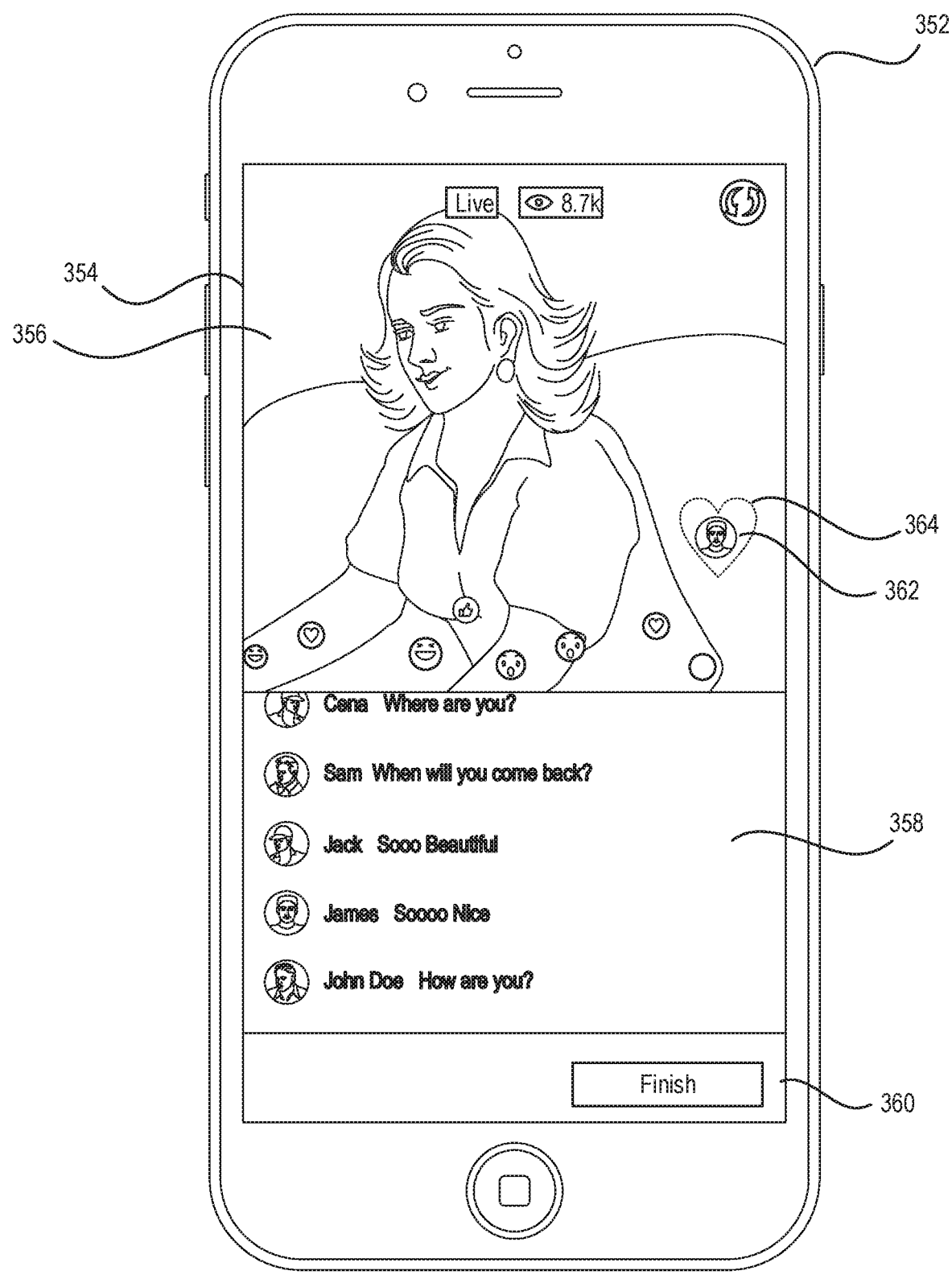

In some embodiments, the broadcaster of the live content stream can acknowledge visual features. As illustrated in the example of FIG. 3K, a broadcaster of the live content stream can access a broadcaster interface 354 that includes a first region 356 in which the live content stream being captured is shown and a second region 358 in which various information relating to the live content stream is presented (e.g., user comments, a number of likes and/or reactions received for the live content stream, etc.). In this example, the second region 358 of the broadcaster interface can also include one or more broadcaster-specific options including, for example, an option 360 for ending the live broadcast. In this example, the broadcaster can select a visual feature 362 to cause a visual acknowledgement 364 to be displayed to indicate that the broadcaster has seen the user's reaction to the live content stream. In some embodiments, the visual acknowledgement 364 is displayed in the interfaces of the broadcaster, the user whose visual feature 362 was acknowledged, or both. In some embodiments, the visual acknowledgement 364 is displayed in the interfaces of all users that are associated with the live content stream (e.g., the broadcaster and the users viewing the live content stream).

Figure 4:
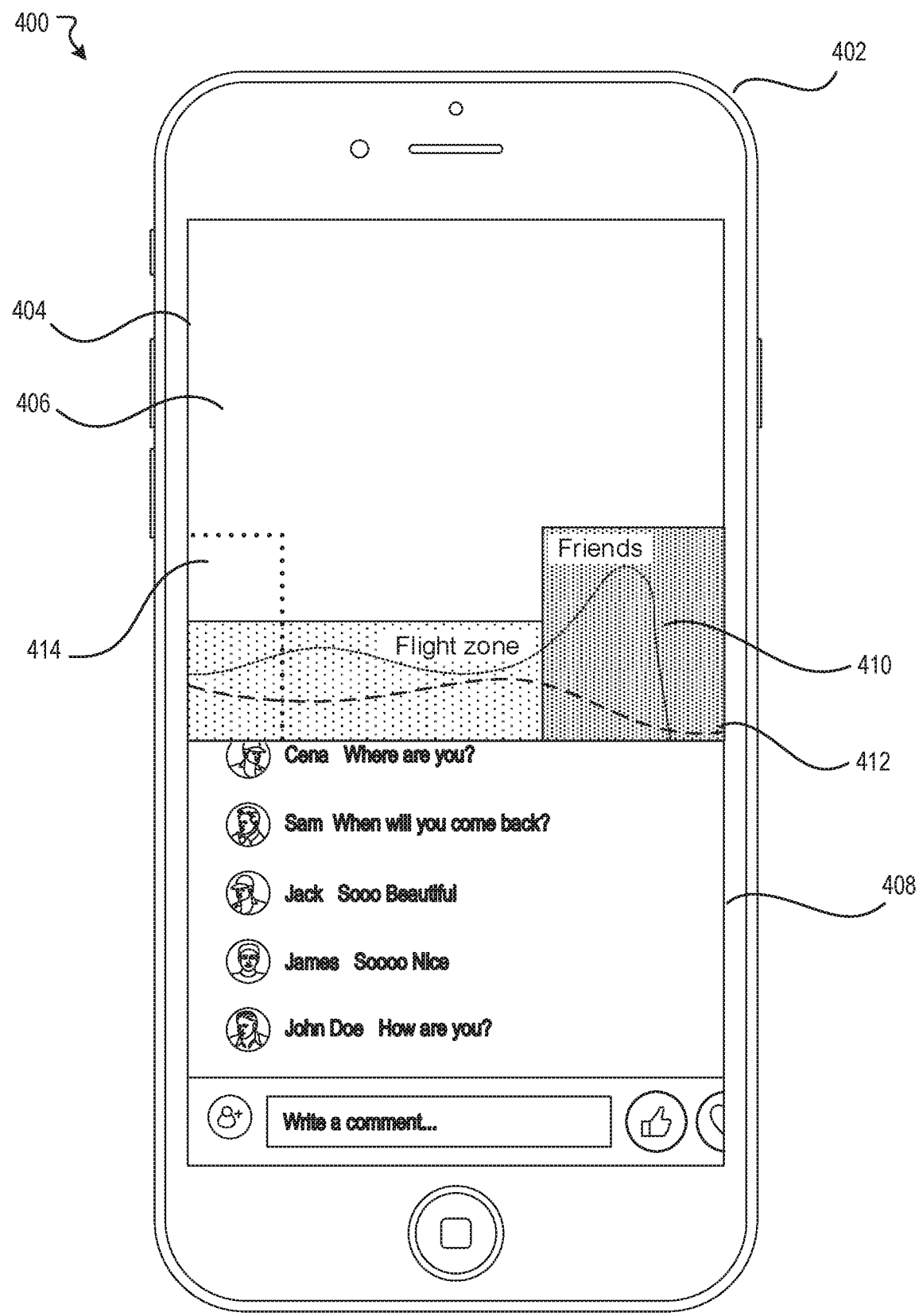
FIG. 4 illustrates an example approach for animating visual features, according to an embodiment of the present disclosure.

FIG. 4 illustrates an example approach 400 for animating visual features, according to an embodiment of the present disclosure. The example of FIG. 4 illustrates a display screen of a computing device 402 that is presenting an interface 404. The interface 404 includes a first region 406 in which a live content stream can be presented and a second region 408 in which various information relating to the live content stream can be presented (e.g., user comments, a number of likes and/or reactions received for the live content stream, etc.). In this example, the first region 406 of the interface 404 illustrates example motion trajectories 410, 412 that may be used to animate visual features depending on the animation being applied. For example, in some embodiments, a firework animation can be applied to a visual feature. In such embodiments, the visual feature can follow a first motion trajectory 410 in which the visual feature is animated like a firework and then navigated along the first motion trajectory 410 until the visual feature exits the interface 404, as described above. In some embodiments, a wind animation can be applied to a visual feature. In such embodiments, the visual feature can follow a second motion trajectory 412 in which the visual feature is navigated along the second motion trajectory 414 until the visual feature exits the interface 404, as described above. The motion trajectories 410 and 412 are provided merely as examples and, naturally, the trajectories used may vary. As mentioned, in some embodiments, motion trajectories may be randomly varied so not all visual features follow the same trajectory. In some embodiments, the size of the displayed visual features is gradually reduced once the visual features reach a threshold region 414.

Figure 5:
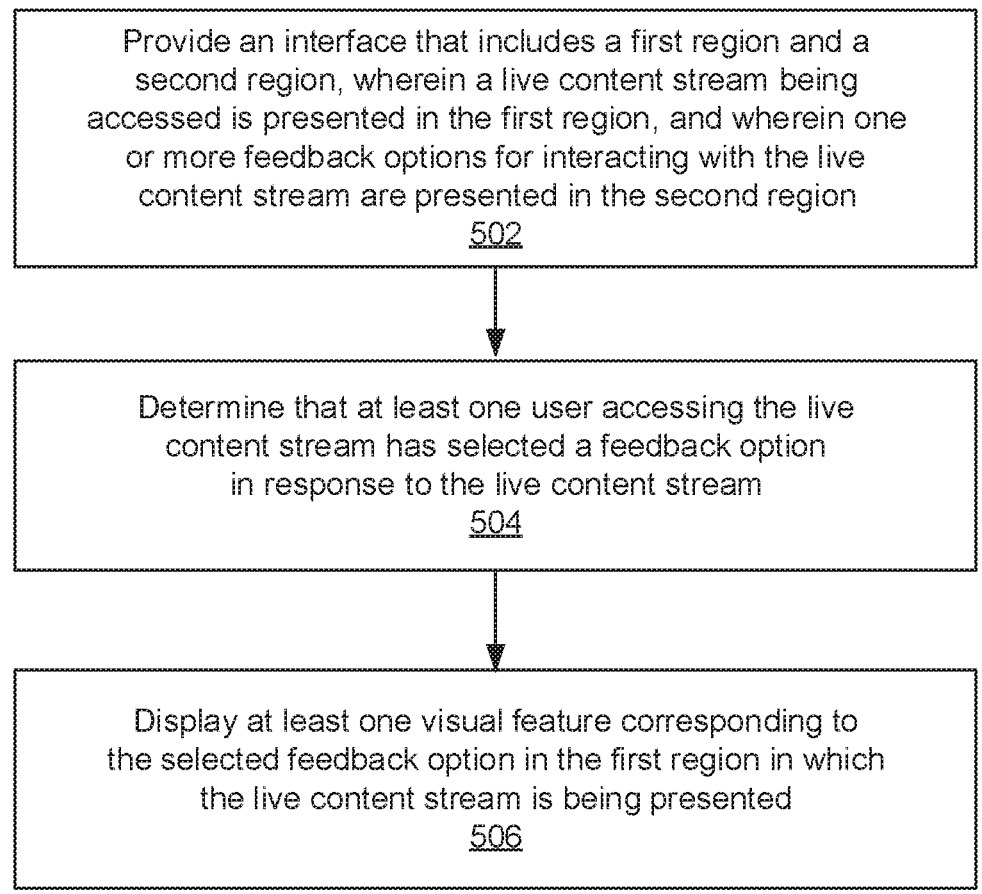
FIG. 5 illustrates an example process for interacting with content items, according to various embodiments of the present disclosure.

FIG. 5 illustrates an example process 500 for interacting with content items, according to various embodiments of the present disclosure. It should be appreciated that there can be additional, fewer, or alternative steps performed in similar or alternative orders, or in parallel, within the scope of the various embodiments discussed herein unless otherwise stated.

At block 502, the example process 500 can provide an interface that includes a first region and a second region, wherein a live content stream being accessed is presented in the first region, and wherein one or more feedback options for interacting with the live content stream are presented in the second region. At block 504, a determination is made that at least one user accessing the live content stream has selected a feedback option in response to the live content stream. At block 506, at least one visual feature corresponding to the selected feedback option is displayed in the first region in which the live content stream is being presented.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
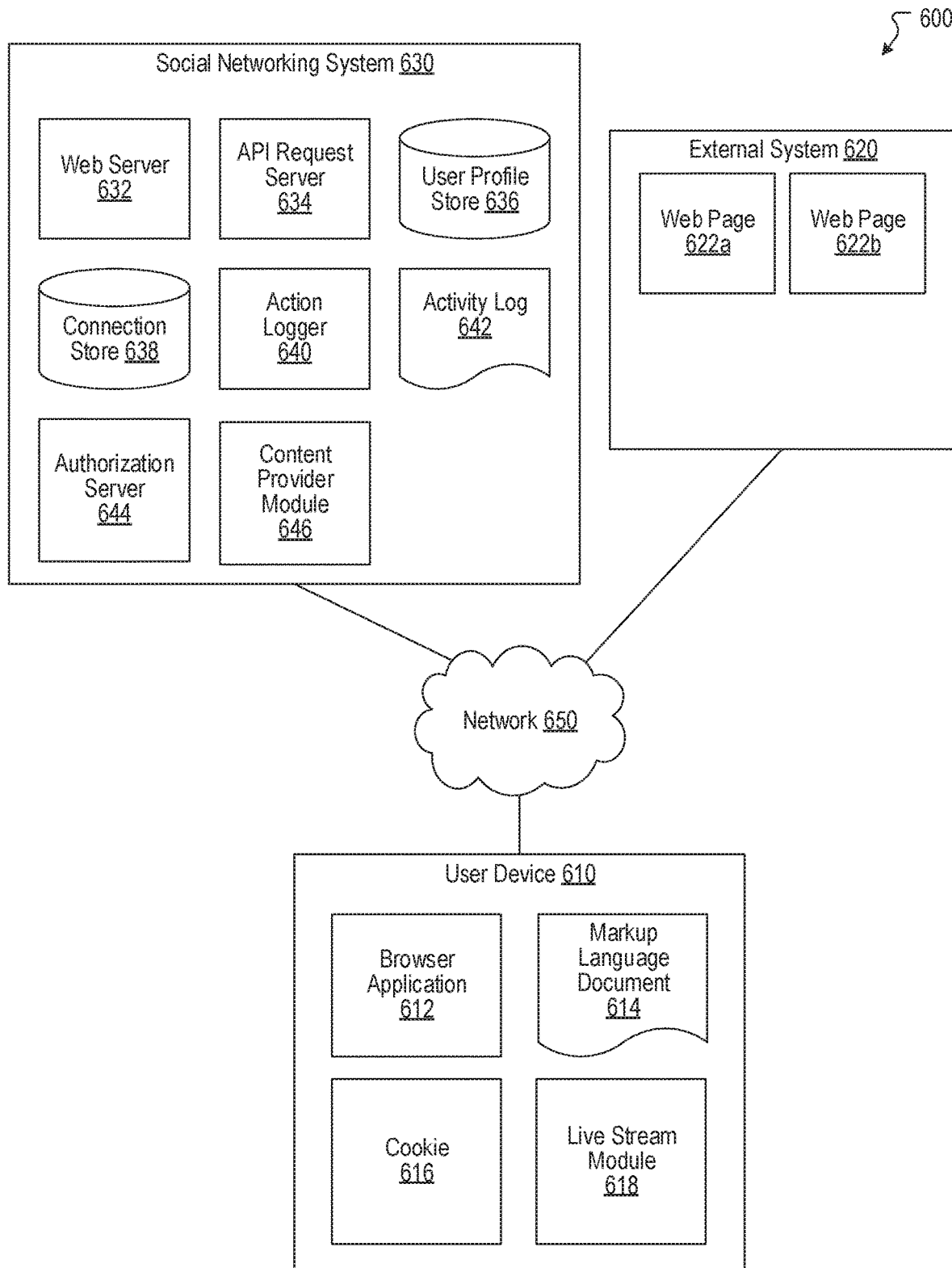
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650.

In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content provider module 646. The content provider module 646 can, for example, be implemented as the content provider module 102 of FIG. 1. In some embodiments, the user device 610 can include a live stream module 618. The live stream module 618 can, for example, be implemented as the live stream module 106 of FIG. 1. As discussed previously, it should be appreciated that there can be many variations or other possibilities.

Hardware Implementation

Figure 7:
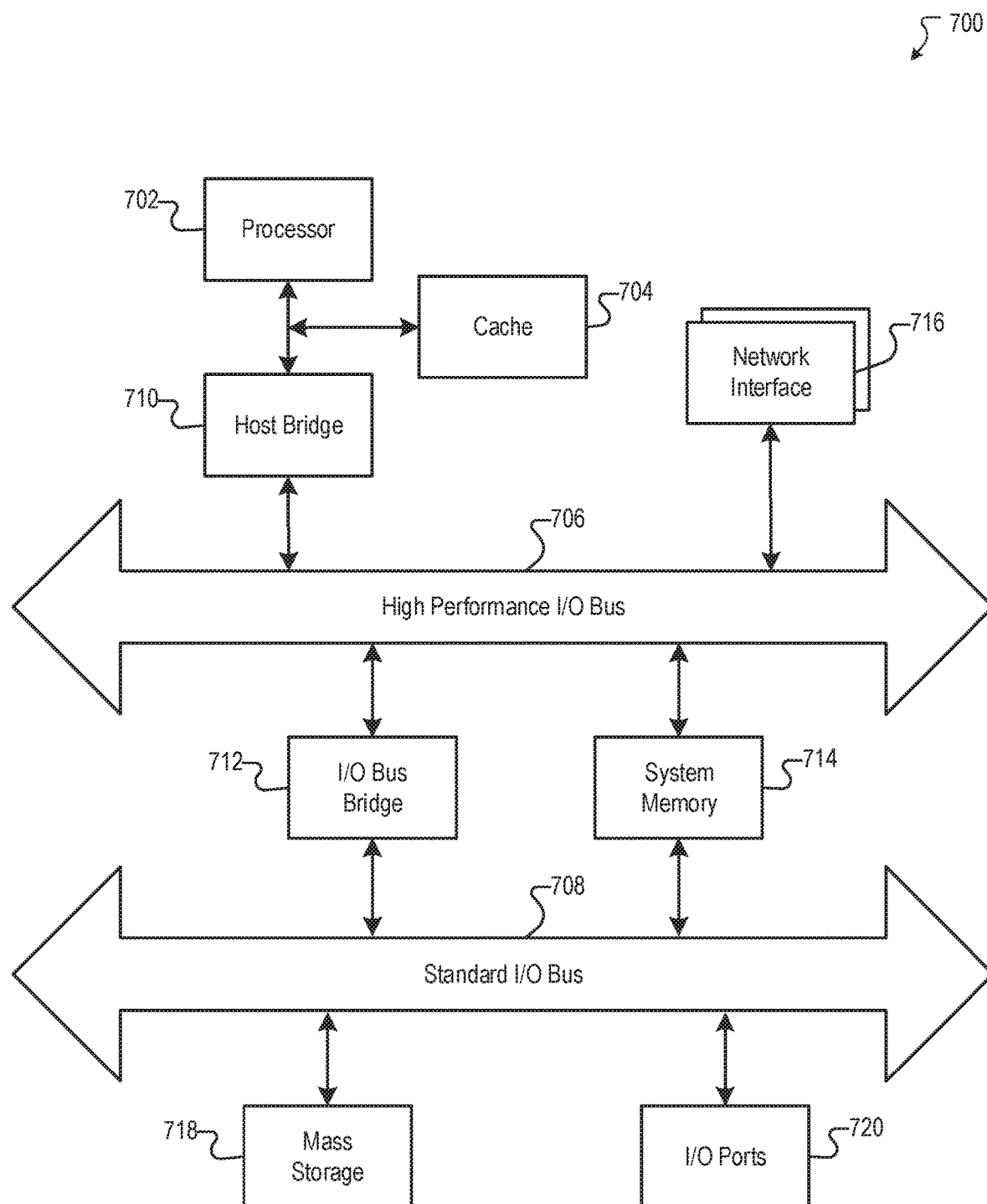
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
providing, by a computing device, to a first user, a graphical user interface that includes a first region and a second region, wherein a live content stream being accessed is presented in the first region, and wherein one or more feedback options for interacting with the live content stream are presented in the second region;
determining, by the computing device, that at least one second user accessing the live content stream has selected a feedback option in response to the live content stream;
determining, by the computing device, whether or not the second user is a social connection of the first user in a social networking system; and
causing, by the computing device, at least one visual feature corresponding to the selected feedback option to be displayed in the first region in which the live content stream is being presented,
wherein, when the second user is a social connection of the first user, a first type of animation is applied to the visual feature, and
wherein, when the second user is not a social connection of the first user, a second type of animation is applied to the visual feature.

2. The computer-implemented method of claim 1, wherein the first type of animation is a firework animation in which the visual feature is animated to resemble an exploding firework while being navigated across the first region of the graphical user interface along a first motion trajectory.

3. The computer-implemented method of claim 2, wherein the visual feature initially corresponds to an avatar of the second user that selected the feedback option.

4. The computer-implemented method of claim 3, wherein, while being navigated along the first motion trajectory, the visual feature is transitioned from the avatar to an icon corresponding to the selected feedback option.

5. The computer-implemented method of claim 4, wherein the second type of animation is a wind animation in which the visual feature is navigated across the first region of the graphical user interface along a second motion trajectory.

6. The computer-implemented method of claim 1, the method further comprising:
   determining, by the computing device, that a user broadcasting the live content stream has interacted with the visual feature through a computing device being operated by the broadcasting user; and
   causing, by the computing device, a visual acknowledgement for the visual feature to be displayed in the first region in which the live content stream is being presented.

7. The computer-implemented method of claim 1, the method further comprising:
   determining, by the computing device, that the second user accessing the live content stream has selected a second feedback option in response to the live content stream; and
   causing, by the computing device, at least one visual feature corresponding to the second feedback option to also be displayed in the first region in which the live content stream is being presented.

8. The computer-implemented method of claim 1, wherein the feedback option is one of a like option or a reaction from a set of reaction options.

9. A system comprising:
   at least one processor; and
   a memory storing instructions that, when executed by the at least one processor, cause the system to perform:
      providing, to a first user, a graphical user interface that includes a first region and a second region, wherein a live content stream being accessed is presented in the first region, and wherein one or more feedback options for interacting with the live content stream are presented in the second region;
      determining that at least one second user accessing the live content stream has selected a feedback option in response to the live content stream;
      determining whether or not the second user is a social connection of the first user in a social networking system; and
      causing at least one visual feature corresponding to the selected feedback option to be displayed in the first region in which the live content stream is being presented,
      wherein, when the second user is a social connection of the first user, a first type of animation is applied to the visual feature, and
      wherein, when the second user is not a social connection of the first user, a second type of animation is applied to the visual feature.

10. The system of claim 9, wherein the first type of animation is a firework animation in which the visual feature is animated to resemble an exploding firework while being navigated across the first region of the graphical user interface along a first motion trajectory.

11. The system of claim 10, wherein the visual feature initially corresponds to an avatar of the second user that selected the feedback option.

12. The system of claim 11, wherein, while being navigated along the first motion trajectory, the visual feature is transitioned from the avatar to an icon corresponding to the selected feedback option.

13. A non-transitory computer-readable storage medium including instructions that, when executed by at least one processor of a computing system, cause the computing system to perform a method comprising:
   providing, to a first user, a graphical user interface that includes a first region and a second region, wherein a live content stream being accessed is presented in the first region, and wherein one or more feedback options for interacting with the live content stream are presented in the second region;
   determining that at least one second user accessing the live content stream has selected a feedback option in response to the live content stream;
   determining whether or not the second user is a social connection of the first user in a social networking system; and
   causing at least one visual feature corresponding to the selected feedback option to be displayed in the first region in which the live content stream is being presented,
   wherein, when the second user is a social connection of the first user, a first type of animation is applied to the visual feature, and
   wherein, when the second user is not a social connection of the first user, a second type of animation is applied to the visual feature.

14. The non-transitory computer-readable storage medium of claim 13, wherein the first type of animation is a firework animation in which the visual feature is animated to resemble an exploding firework while being navigated across the first region of the graphical user interface along a first motion trajectory.

15. The non-transitory computer-readable storage medium of claim 14, wherein the visual feature initially corresponds to an avatar of the second user that selected the feedback option.

16. The non-transitory computer-readable storage medium of claim 15, wherein, while being navigated along the first motion trajectory, the visual feature is transitioned from the avatar to an icon corresponding to the selected feedback option.

* * * * *